United States Patent
Smith

(10) Patent No.: US 9,608,417 B2
(45) Date of Patent: Mar. 28, 2017

(54) ELECTRICAL FITTING FOR NON-METALLIC ELECTRICAL CABLE

(71) Applicant: Bridgeport Fittings, Inc., Startford, CT (US)

(72) Inventor: Lawrence J. Smith, Stamford, CT (US)

(73) Assignee: BRIDGEPORT FITTINGS, INC., STRATFORD, CT (US)

( * ) Notice: Subject to any disclaimer, the term of this patent is extended or adjusted under 35 U.S.C. 154(b) by 237 days.

(21) Appl. No.: 14/680,512

(22) Filed: Apr. 7, 2015

(65) Prior Publication Data

US 2016/0301146 A1  Oct. 13, 2016

(51) Int. Cl.
  *H02G 3/04* (2006.01)
  *H02G 15/18* (2006.01)
  *H02G 3/08* (2006.01)
  *H02G 3/06* (2006.01)

(52) U.S. Cl.
  CPC ............ *H02G 3/083* (2013.01); *H02G 3/065* (2013.01); *H02G 3/0616* (2013.01)

(58) Field of Classification Search
  CPC ....... H02G 3/083; H02G 3/0616; H02G 3/065
  USPC ........................................ 174/68.3
  See application file for complete search history.

(56) References Cited

U.S. PATENT DOCUMENTS 1,736,888 A * 11/1929 Selah .................. H02G 3/0683
  285/154.3
1,793,882 A * 2/1931 Yanchenko ............ H02G 3/065
  16/108
1,852,381 A * 4/1932 Teas ...................... H02G 3/0406
  174/82

(Continued)

FOREIGN PATENT DOCUMENTS

| AU | 2002219381 B2 | 9/2002 |
| CN | 203241572 U | 10/2013 |
| DE | 3605063 C1 | 10/1987 |

OTHER PUBLICATIONS

PVC Non-Metallic (NM) Cable Connector; printed from Home/ Electrical Fittings/Cable & Cord Connectors/PVC Non-Metallic (NM) Cable Connector; product listing (prior to Apr. 7, 2015).

(Continued)

*Primary Examiner* — Timothy Thompson
*Assistant Examiner* — Rhadames J Alonzo Miller
(74) *Attorney, Agent, or Firm* — Ware, Fressola, Maguire & Barber LLP

(57) ABSTRACT

An electrical fitting to secure multiple non-metallic electrical cables has a body having a first end for insertion into an electrical panel box or to receive conduit, and a second end having an opening with apertures formed near a periphery thereof, the body having a hollow interior for passage of cables, and a cable securing device having a plate dimensioned to mount to the body and clamping devices, each having a pair of resilient clamp fingers to secure at least one cable, each finger having a terminating end adjacent the terminating end of the other finger, a pair of squeezable arms extending to facilitate cable insertion and removal, and a pair of anchoring fingers extending from the first surface of the plate, each anchoring finger having a protruding member to snap into one of the apertures so as to secure the cable securing device especially when the arms are squeezed.

21 Claims, 16 Drawing Sheets

(56) References Cited

U.S. PATENT DOCUMENTS

| | | | |
|---|---|---|---|
| 2,195,933 A * | 4/1940 | Marlborough | H02G 15/18 174/21 R |
| 2,639,927 A * | 5/1953 | Billeter | H02G 3/065 285/154.2 |
| 2,962,542 A * | 11/1960 | Witt | H02G 15/113 174/20 |
| 3,306,638 A | 2/1967 | Rubin | |
| 4,169,572 A | 10/1979 | Simon | |
| 4,350,839 A * | 9/1982 | Lass | H02G 3/083 174/153 G |
| 4,640,980 A * | 2/1987 | Batt | H05K 9/00 174/36 |
| 4,723,054 A * | 2/1988 | Billet | H02G 15/18 174/74 A |
| 4,919,370 A * | 4/1990 | Martin | F16L 5/00 174/153 G |
| 4,983,784 A * | 1/1991 | Whitlock | F16L 5/06 174/652 |
| 5,118,057 A * | 6/1992 | Martin | H02G 3/065 174/153 G |
| 5,374,017 A | 12/1994 | Martin et al. | |
| 5,799,984 A | 9/1998 | Reynolds, Jr. | |
| 5,912,431 A | 6/1999 | Sheehan | |
| 6,034,326 A * | 3/2000 | Jorgensen | H02G 3/0691 174/660 |
| 6,160,216 A | 12/2000 | McMahon | H01B 7/0045 174/102 R |
| 6,194,661 B1 * | 2/2001 | Gretz | H01R 13/745 174/153 R |
| 6,352,439 B1 | 3/2002 | Stark et al. | |
| 6,355,884 B1 * | 3/2002 | Gretz | H01R 13/745 174/659 |
| 6,521,831 B1 * | 2/2003 | Gretz | H01R 13/745 174/153 R |
| 6,916,988 B1 | 7/2005 | Auray et al. | |
| 7,005,581 B2 | 2/2006 | Burnette | |
| 7,057,107 B2 | 6/2006 | Auray et al. | |
| 7,064,272 B2 | 6/2006 | Auray et al. | |
| 7,075,007 B2 * | 7/2006 | Auray | F16L 5/00 174/656 |
| 7,078,623 B1 | 7/2006 | Sheehan | |
| 7,151,223 B2 | 12/2006 | Auray et al. | |
| 7,154,042 B2 | 12/2006 | Auray et al. | |
| 7,161,095 B1 * | 1/2007 | Gretz | H02G 3/0666 16/2.1 |
| 7,205,489 B2 | 4/2007 | Auray et al. | |
| 7,211,744 B2 | 5/2007 | Jorgensen | |
| 7,304,251 B1 * | 12/2007 | Gretz | H02G 3/0691 174/653 |
| 7,358,448 B2 | 4/2008 | Auray et al. | |
| 7,402,752 B1 * | 7/2008 | Kiely | H02G 3/0691 174/84 R |
| 7,488,905 B2 | 2/2009 | Kiely et al. | |
| 7,615,714 B2 | 11/2009 | Pyron et al. | |
| 7,723,623 B2 * | 5/2010 | Kiely | F16L 5/00 174/650 |
| 7,820,922 B2 | 10/2010 | Auray et al. | |
| 7,824,213 B1 * | 11/2010 | Korcz | H01R 13/5816 174/64 |
| 7,952,034 B2 | 5/2011 | Kiely et al. | |
| 8,119,933 B2 * | 2/2012 | Auray | F16L 5/00 174/650 |
| 8,124,891 B1 * | 2/2012 | Gretz | H02G 3/0691 164/137 |
| 8,242,369 B2 * | 8/2012 | Kiely | H01R 9/032 174/84 R |
| 8,253,043 B1 | 8/2012 | Kiely | |
| 8,487,196 B1 | 7/2013 | Baldwon et al. | |
| 8,857,039 B2 | 10/2014 | Sathyanarayana et al. | |
| 2004/0057187 A1 * | 3/2004 | Kuboshima | H01R 9/032 361/118 |
| 2008/0277160 A1 * | 11/2008 | Auray | F16L 5/00 174/659 |
| 2009/0130903 A1 * | 5/2009 | Tsukashima | H01R 9/032 439/607.23 |
| 2010/0084854 A1 | 4/2010 | Sathyanarayana et al. | |
| 2010/0163304 A1 * | 7/2010 | Auray | F16L 5/00 174/72 C |
| 2010/0261365 A1 * | 10/2010 | Sakakura | H01R 9/032 439/271 |
| 2011/0290550 A1 * | 12/2011 | Kiely | H02G 3/0691 174/480 |
| 2013/0157491 A1 | 6/2013 | Chavan et al. | |
| 2014/0262486 A1 * | 9/2014 | Korcz | H05K 5/0247 174/520 |
| 2015/0280411 A1 * | 10/2015 | Plathe | H01R 13/74 174/660 |
| 2015/0357806 A1 * | 12/2015 | Korcz | H02G 3/083 174/541 |
| 2016/0064118 A1 * | 3/2016 | Wakabayashi | H01B 7/0018 174/72 A |

OTHER PUBLICATIONS

New Products: Duplex Connector, Cable Pulling Grips & More; Whipper Snap design (Bridgeport Fittings); Electrical Construction and Maintenance; Jun. 22, 2012.

Wire Connector Set; http://www.seedstudio.com/depot/; product page (prior to Apr. 7, 2015).

* cited by examiner

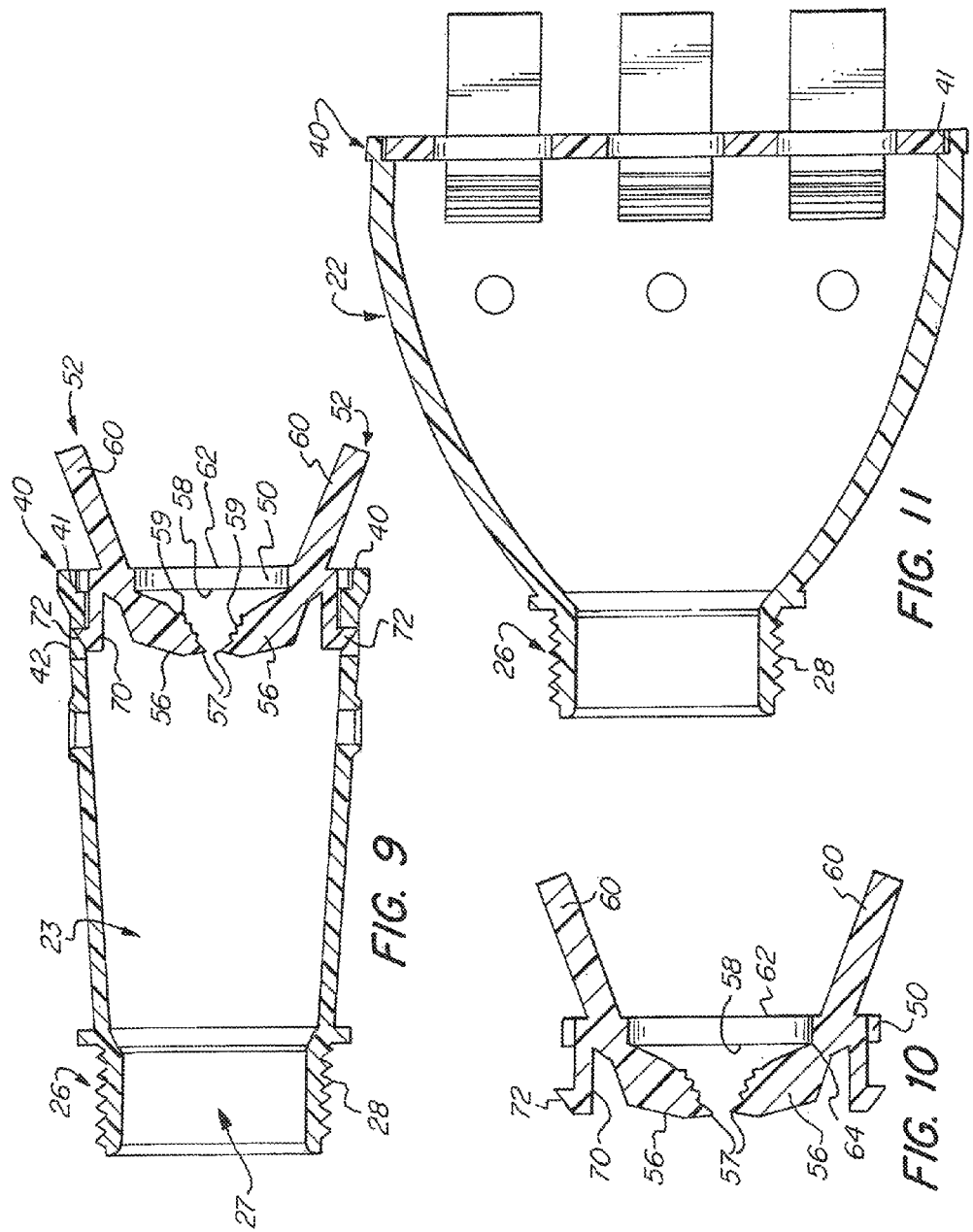

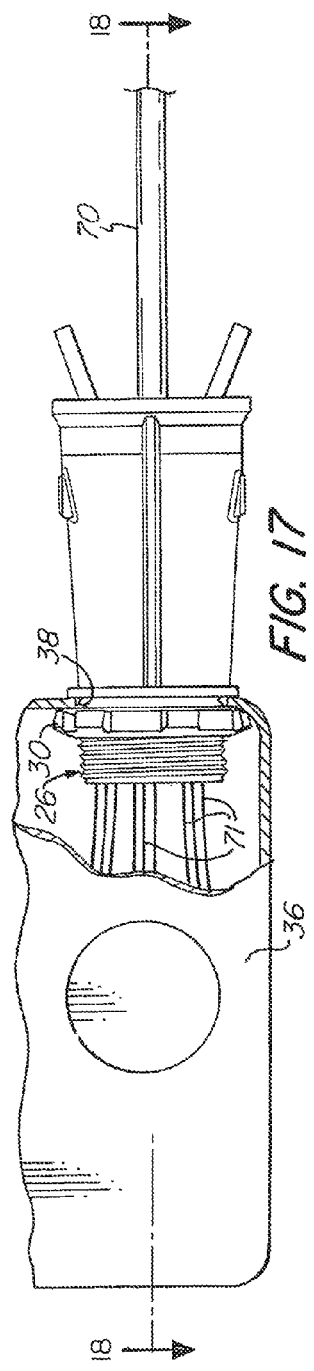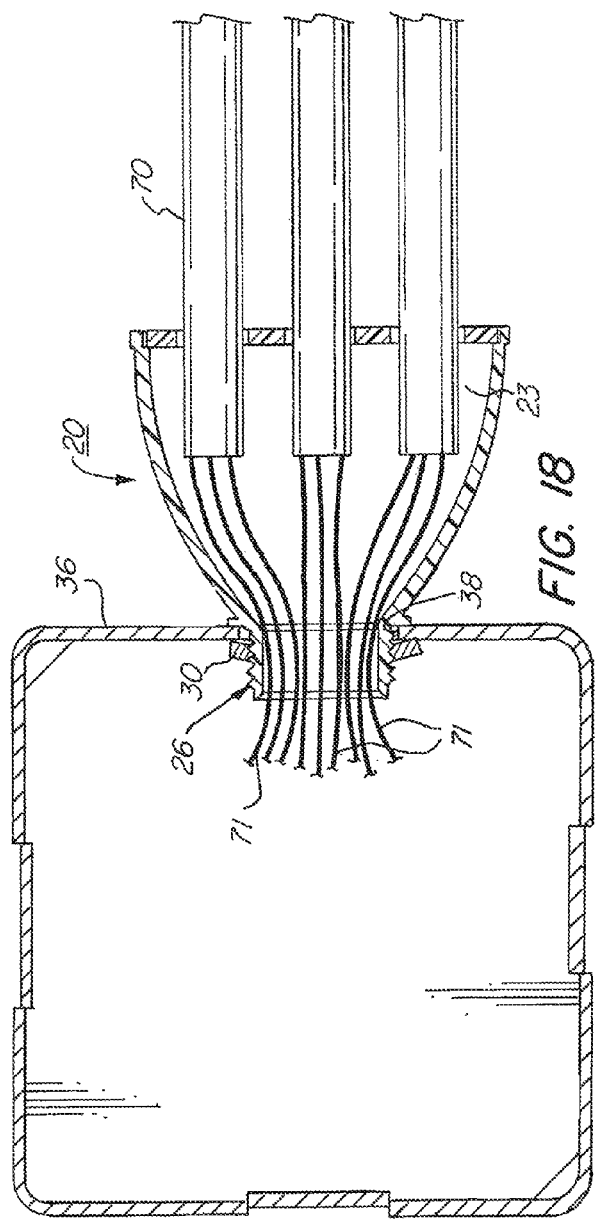

ELECTRICAL FITTING FOR NON-METALLIC ELECTRICAL CABLE

TECHNICAL FIELD

The present invention relates to electrical fittings for securing non-metallic (NM) sheath electrical conductor cables to an electrical panel box or to an electrical metallic tubing (EMT) or rigid conduit and specifically such a fitting for use with securing multiple non-metallic electrical cables to such devices.

BACKGROUND OF THE INVENTION

There are a number of prior art devices directed to securing two electrical cables to a panel box via a knockout hole or as a transition fitting for connecting two electrical cables to an EMT or rigid conduit. These devices, sometimes referred to as duplex electrical connectors or duplex electrical fittings, can provide for the connection of two electrical cables so as to allow the passage of electrical conductors within those cables into either a panel box or into an EMT or rigid conduit. Such fittings have typically been used with armored clad (AC) cables and metal clad (MC) cables. It has been realized that there is a need in certain situations for fittings that can accommodate more than two electrical cables.

Furthermore, although there are non-metallic (NM) electrical cable connectors for securing NM cable to electrical panel boxes and the like, such connectors have typically provided a single access region for securing one or more electrical cables (see, for example, U.S. Pat. Nos. 5,374,017 and 7,211,744). There is a need for an electrical fitting that provides easy insertion and removal of NM electrical cables and especially for an electrical fitting able to accommodate multiple NM cables.

SUMMARY OF THE INVENTION

An embodiment of the present invention is an electrical fitting to secure multiple non-metallic electrical (NM) cables, comprising a body having a first end having a bore formed therethrough either dimensioned for insertion into a knockout hole of an electrical panel box or the like or dimensioned to receive an electrical metallic tubing or rigid conduit, and a second end having an opening formed therein and with apertures formed near a periphery thereof, the body having a hollow interior for passage of non-metallic electrical cables therethrough, and a cable securing device having a plate dimensioned to mount to the body at the second end of the body, and a plurality of clamping devices integrally formed with the plate, each clamping device having a pair of clamp fingers extending from a first surface of the plate, each finger of the pair of clamp fingers having a terminating end adjacent the terminating end of the other clamp finger of said pair of clamp fingers, each pair of clamp fingers dimensioned to allow passage of at least one NM electrical cable between said terminating ends, the clamp fingers dimensioned for resilient movement relative to each other so as to grasp an NM electrical cable or cables passing between the terminating ends thereof, a pair of arms integrally formed at a second end of each clamp finger and extending beyond a second surface of the plate, the arms dimensioned for squeezing, and a pair of anchoring fingers integrally formed with the pair of clamp fingers and arms, said anchoring fingers extending from the first surface of the plate, each anchoring finger having a protruding member formed on an end of said anchoring finger, each protruding member dimensioned for receipt in one of the apertures formed in the body, wherein each protruding member is urged toward the body when the arms of the clamping device are squeezed together while the terminating ends of the clamp fingers are correspondingly moved away from each other, thereby facilitating insertion of a cable or cables between the terminating ends of the clamp fingers or release of a cable or cables secured by the terminating ends of the clamp fingers, while simultaneously securing the clamping device to the body during squeezing of the arms.

Another embodiment of the present invention is the electrical fitting as described above, wherein each clamp finger has at least one ridge formed thereon facing toward the other clamp finger of said pair of clamp fingers, said at least one ridge of each clamp finger to facilitate grasping of an electrical cable.

A further embodiment of the present invention is the electrical fitting as described above, wherein the cable securing device is fabricated from nylon.

A still further embodiment of the present invention is the electrical fitting as described above, wherein the nylon is nylon 6-6.

Another embodiment of the present invention is the electrical fitting as described above, wherein the nylon is nylon 6-12.

A further embodiment of the present invention is the electrical fitting as described above, wherein the first end of the body has a cylindrical shape with threads on an exterior of the first end, the first end dimensioned for receipt of a locking nut so as to secure the fitting to a panel box or the like after insertion through a knockout of the panel box or the like.

A further embodiment of the present invention is the electrical fitting as described above, wherein the first end of the body has a cylindrical shape with extending flexible tabs formed thereon for snap-in engagement to a panel box or the like when inserted into a knockout hole of the panel box or the like.

A still further embodiment of the present invention is the electrical fitting as described above, wherein the first end has a flange formed thereon in proximity to the tabs so as to facilitate said snap-in engagement.

Another embodiment of the present invention is the electrical fitting as described above, wherein the first end of the body is cylindrical in shape dimensioned for receipt of a metallic sleeve thereover and having at least one opening formed therein, the metallic sleeve providing additional structural rigidity to the first end of the body, the sleeve having a threaded hole formed therein alignable with the at least one opening formed in the first end of the body for passage of a fastener so as to secure an electrical metallic tubing or rigid conduit when placed within the bore formed in first end of the plastic body.

A further embodiment of the present invention is the electrical fitting as described above, wherein the body is formed from plastic.

A further embodiment of the present invention is the electrical fitting as described above, wherein the plastic is polyvinylchloride.

A still further embodiment of the present invention is the electrical fitting as described above, wherein the body is fabricated from die cast zinc or die cast aluminum.

Another embodiment of the present invention is the electrical fitting as described above, wherein the plurality of clamping devices equals three.

A further embodiment of the present invention is the electrical fitting as described above, wherein the plurality of clamping devices equals two.

Another embodiment of the present invention is a cable securing device comprising a plate dimensioned to mount to a body of an electrical fitting, and a plurality of clamping devices integrally formed with the plate, each clamping device having a pair of clamp fingers extending from a first surface of the plate, each finger of the pair of clamp fingers having a terminating end adjacent the terminating end of the other clamp finger of said pair of clamp fingers, each pair of clamp fingers dimensioned to allow passage of at least one non-metallic (NM) electrical cable between said terminating ends, the clamp fingers dimensioned for resilient movement relative to each other so as to grasp an NM electrical cable or cables passing between the terminating ends thereof, a pair of arms integrally formed at a second end of each clamp finger and extending beyond a second surface of the plate, the arms dimensioned for squeezing, and a pair of anchoring fingers integrally formed with the pair of clamp fingers and arms, said anchoring fingers extending from the first surface of the plate, each anchoring finger having a protruding member formed on an end of said anchoring finger, each protruding member dimensioned for receipt in an aperture formed in a body of an electrical fitting, wherein each protruding member is urged toward the body when the plate is mounted to the body and when the arms of the clamping device are squeezed together while the terminating ends of the clamp fingers are correspondingly moved away from each other, thereby facilitating insertion of a cable or cables between the terminating ends of the clamp fingers or release of a cable or cables secured by the terminating ends of the clamp fingers, while simultaneously securing the clamping device to the body during squeezing of the arms.

A further embodiment of the present invention is the electrical fitting as described above, wherein each clamp finger has at least one ridge formed thereon facing toward the other clamp finger of said pair of clamp fingers, said at least one ridge of each clamp finger to facilitate grasping of an electrical cable.

A still further embodiment of the present invention is the electrical fitting as described above, wherein the cable securing device is fabricated from nylon.

A further embodiment of the present invention is the electrical fitting as described above, wherein the nylon is nylon 6-6.

A still further embodiment of the present invention is the electrical fitting as described above, wherein the nylon is nylon 6-12.

Another embodiment of the present invention is the electrical fitting as described above, wherein the plurality of clamping devices equals three.

Another embodiment of the present invention is the electrical fitting as described above, wherein the plurality of clamping devices equals two.

BRIEF DESCRIPTION OF THE DRAWINGS

For a fuller understanding of the nature and objects of the present invention, reference is made to the following detailed description taken in connection with the following drawings in which:

FIG. 9 is a cross-sectional view of the electrical fitting taken along line 9-9 of FIG. 3.

FIG. 10 is a cross-sectional view of the cable securing device taken along line 10-10 of FIG. 8.

FIG. 11 is a cross-sectional view of the electrical fitting taken along line 11-11 of FIG. 2.

FIG. 17 is a partially cutaway view of the electrical fitting inserted into a panel box via a knockout hole therein.

FIG. 18 is a cross-sectional view of the electrical fitting and panel box taken along line 18-18 of FIG. 17.

DETAILED DESCRIPTION

Figure 1:
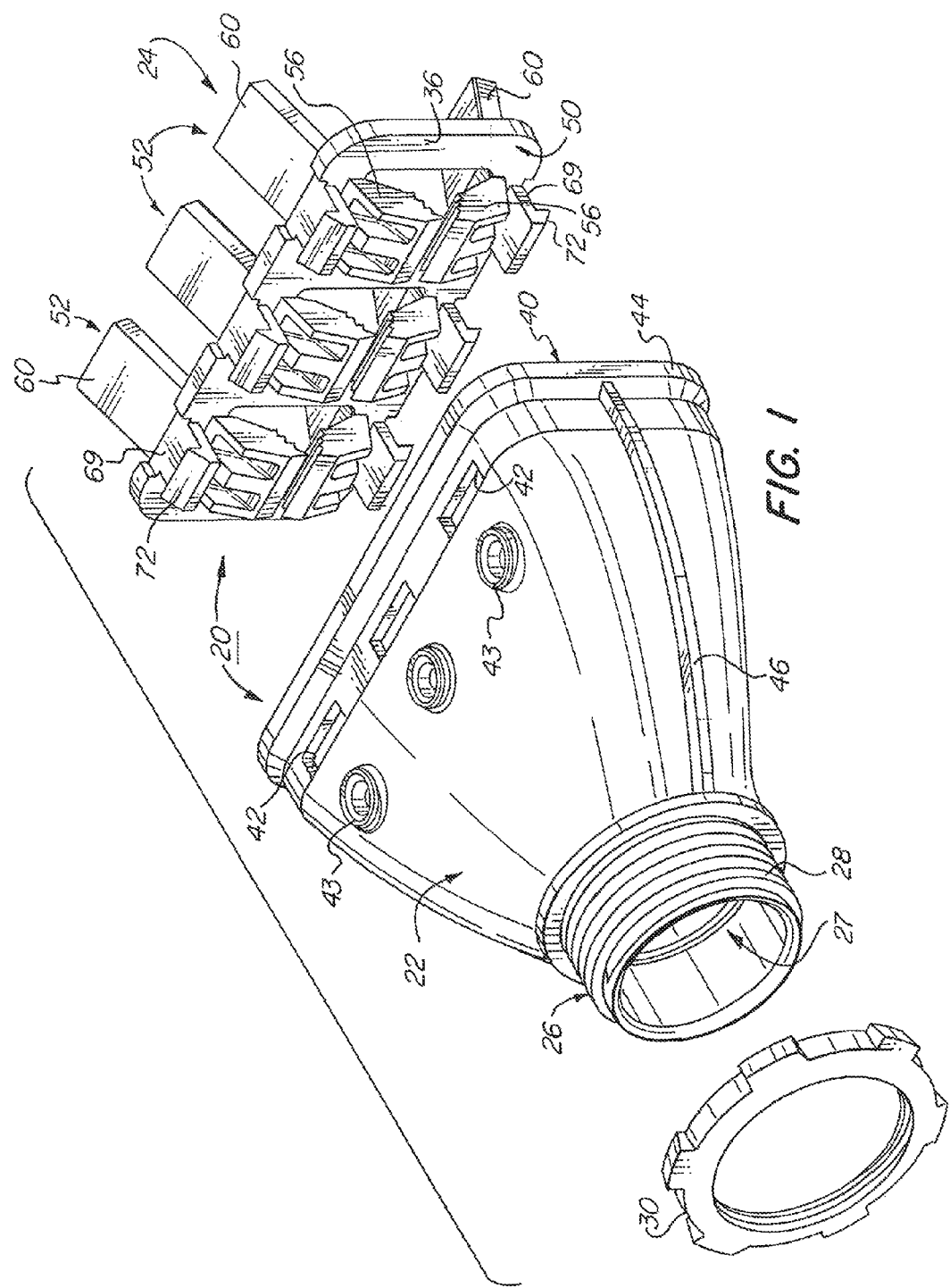
FIG. 1 is an exploded front perspective view of an electrical fitting for securing non-metallic multiple cables according to an embodiment of the present invention, specifically where the fitting is for connection to an electrical panel box or the like and specifically having three clamping devices.
Figure 2:
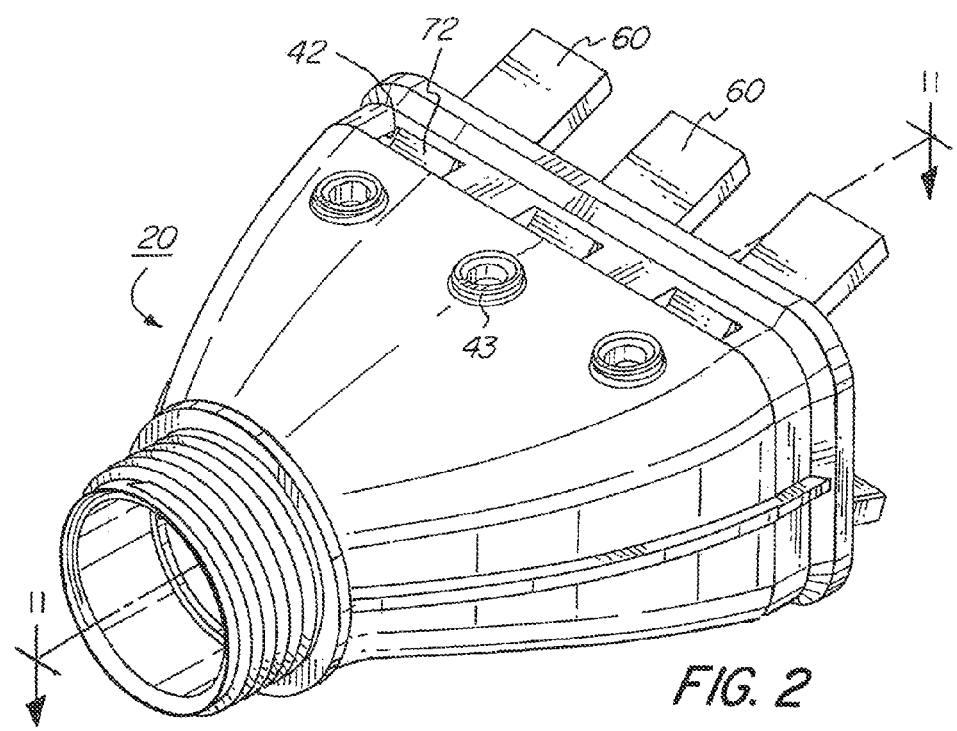
FIG. 2 is a front perspective view of the electrical fitting in its assembled form corresponding to the embodiment shown in FIG. 1.
Figure 3:
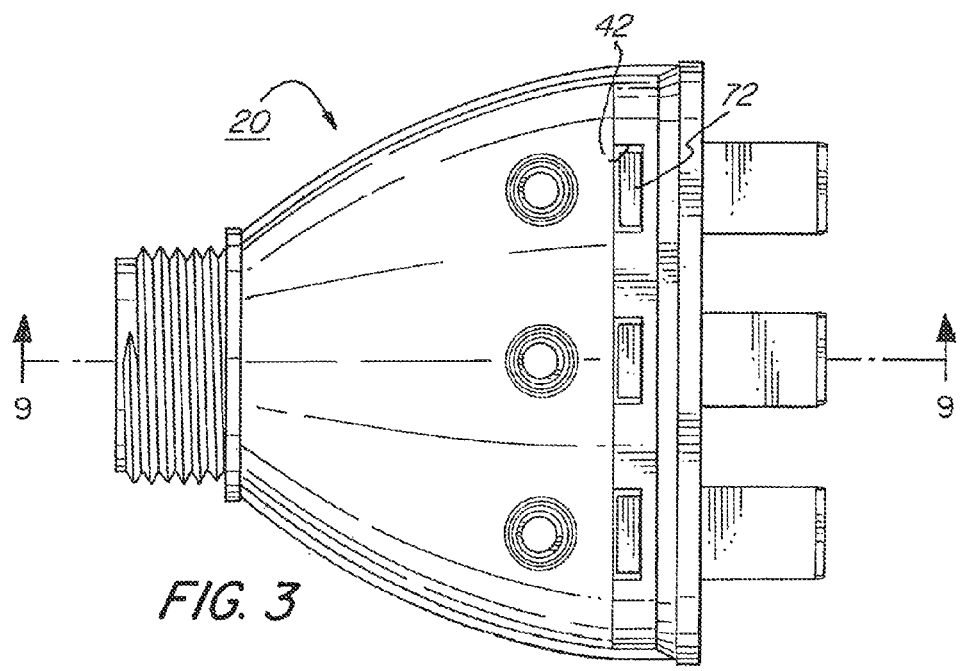
FIG. 3 is a top view of the electrical fitting as shown in FIG. 2, the bottom view being a mirror image thereof.
Figure 4:
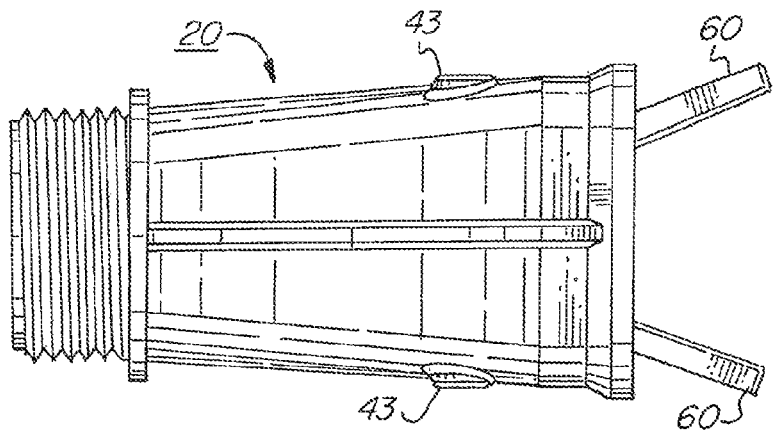
FIG. 4 is a right side view of the electrical fitting as shown in FIGS. 1-3, the left side view being a mirror image thereof.
Figure 5:
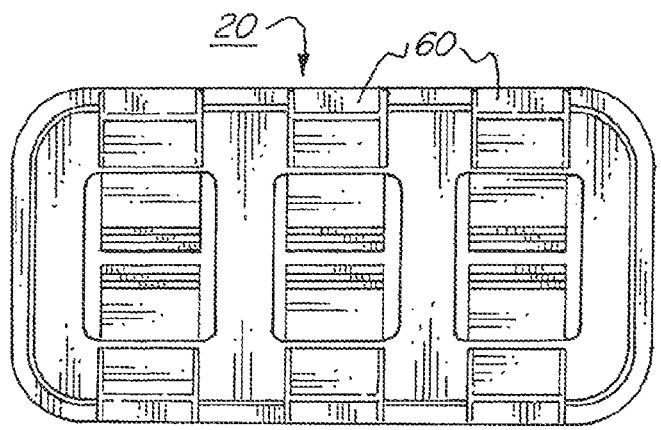
FIG. 5 is a rear view of the electrical fitting as shown in FIGS. 1-4.
Figure 6:
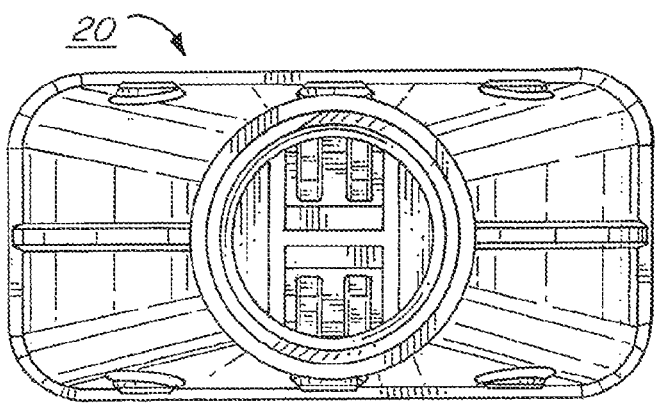
FIG. 6 is a front view of the electrical fitting as shown in FIGS. 1-5.

An embodiment of an electrical fitting 20 to secure multiple non-metallic (NM) cables 70 is shown in FIGS. 1-18. FIGS. 1 and 2 are perspective views of this fitting with FIG. 1 being an exploded perspective view of the assembled fitting shown in FIG. 2.

The fitting has a body 22 with a hollow interior 23 and a cable securing device 24. The body has a first end 26 with a bore 27 formed therein forming part of the hollow interior 23. The first end may be cylindrical with threads 28 on its exterior for threaded attachment of a nut 30 so as to secure the body to an electrical panel box 36 through a knockout hole 38 formed in the panel box. This is best seen in FIGS. 17 and 18 where electrical wires 71 of cable 70 are shown extending through fitting 20 into panel box 36.

Figure 13:
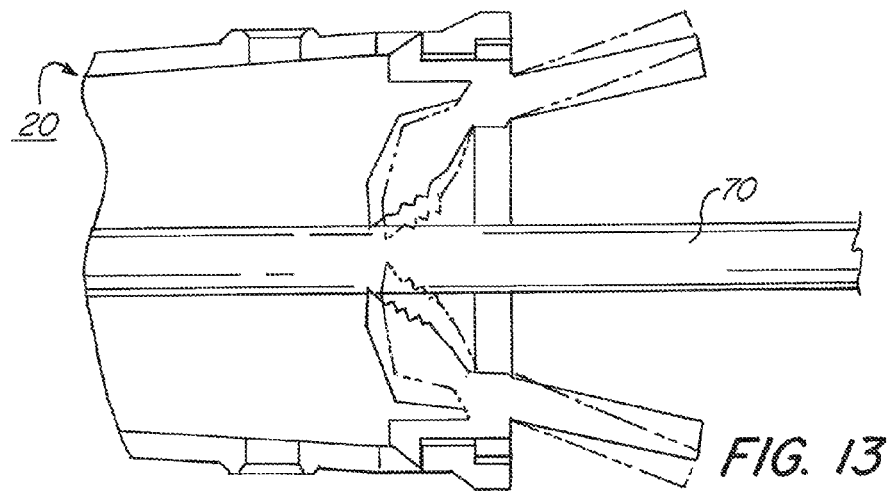
Figure 15:
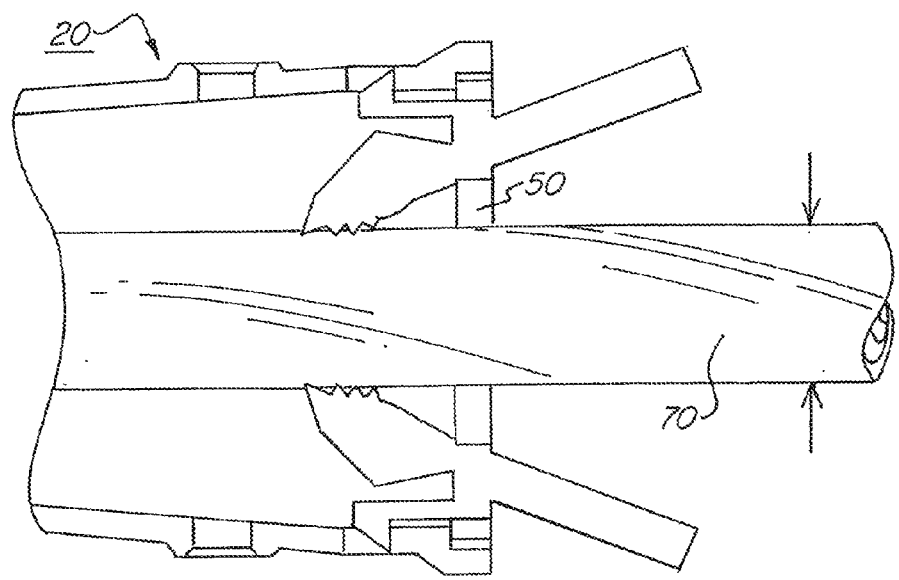
FIG. 15 is an enlarged cross-sectional view similar to those shown in FIGS. 12-14 of the electrical fitting in which a non-metallic electrical cable of a larger size is inserted into the fitting as compared to the NM electrical cables shown in FIGS. 12-14.
Figure 16:
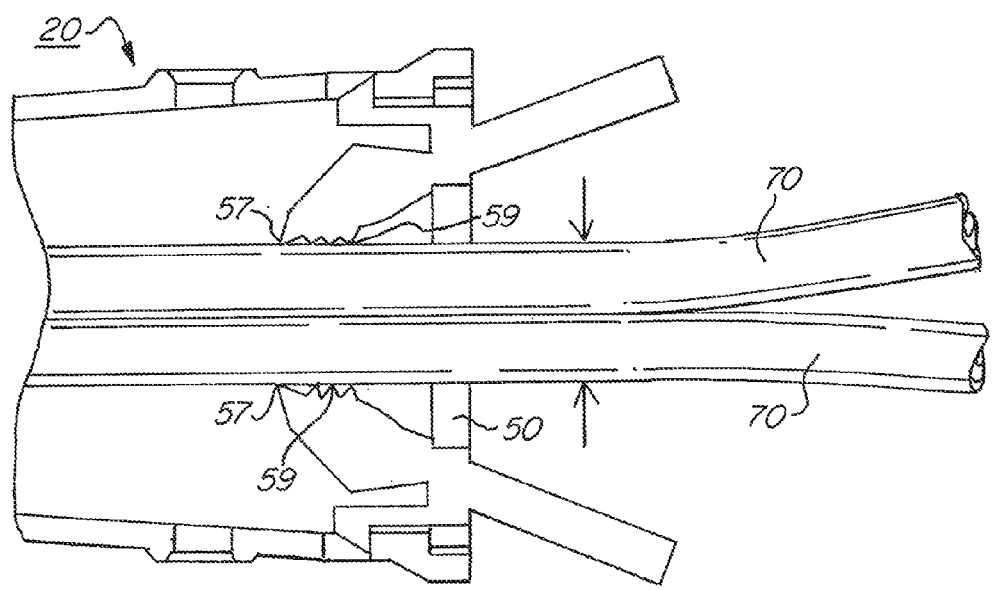
FIG. 16 is an enlarged cross-section view similar to those shown in FIGS. 12-14 of the electrical fitting in which two NM cables are inserted into the fitting.
Figure 19:
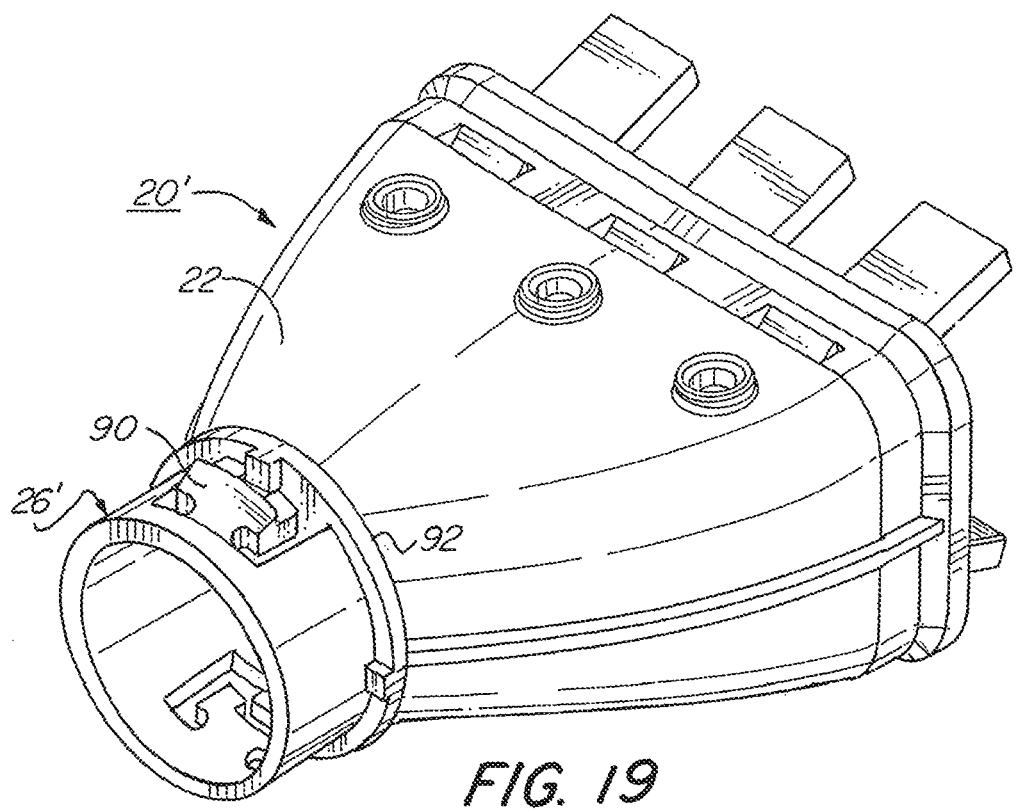
FIG. 19 shows an embodiment of the electrical fitting similar to that shown in FIG. 2, but having a snap-on first end for insertion into a knockout hole of an electrical panel box.
Figure 20:
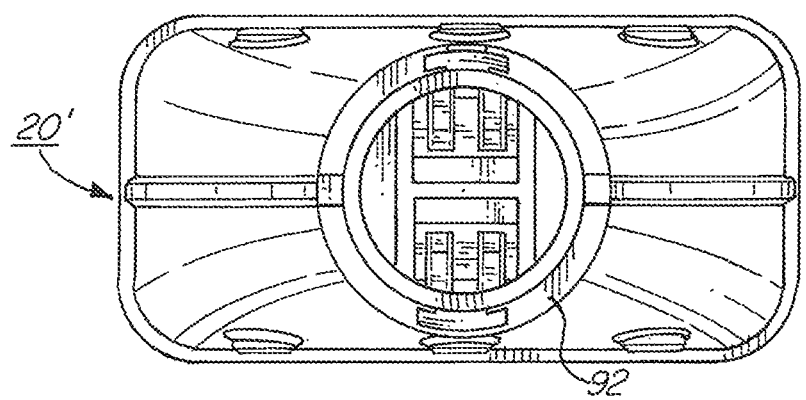
FIG. 20 is a front view of the embodiment shown in FIG. 19.
Figure 21:
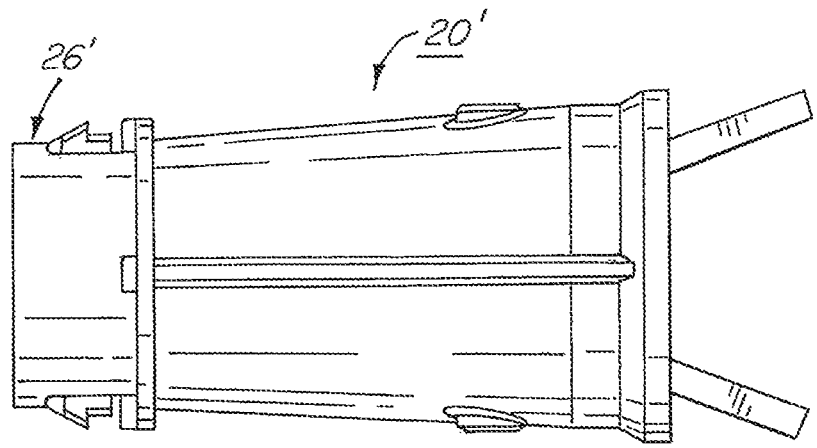
FIG. 21 is a right side view of the embodiment shown in FIG. 19, the left side view being a mirror image thereof.
Figure 22:
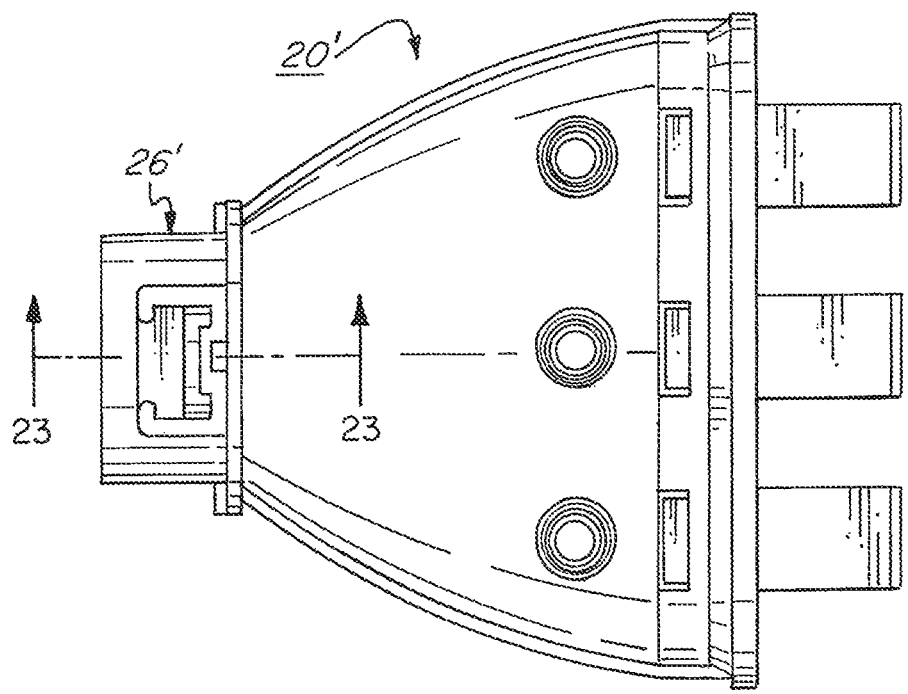
FIG. 22 is a top view of the embodiment shown in FIG. 19, the bottom view being a mirror image thereof.

FIGS. 1 and 9 show that the body also has a second end 40 with apertures 42 formed in the body in proximity to the second end of the body. The second end of the body may include a peripheral flange 44. Visual inspection ports 43 allow for inspection of cables 70 secured to the electrical fitting as seen in FIGS. 13, 15 and 16, for example. The body may also include strengthening ribs 46 on each side of the body.

Body 22 may be molded from plastic, such as polyvinylchloride (PVC) or it can be fabricated from other materials, including die cast zinc or die cast aluminum, for example.

FIG. 1 shows that the cable securing device 24 has a plate 50 to which a plurality of clamping devices 52 are integrally formed. The plate is dimensioned to mount to the body at the second end 40 of the body. As seen in FIGS. 9 and 11, second end 40 of body 22 may include a cutout step 41 for receipt of plate 50.

Figure 12:
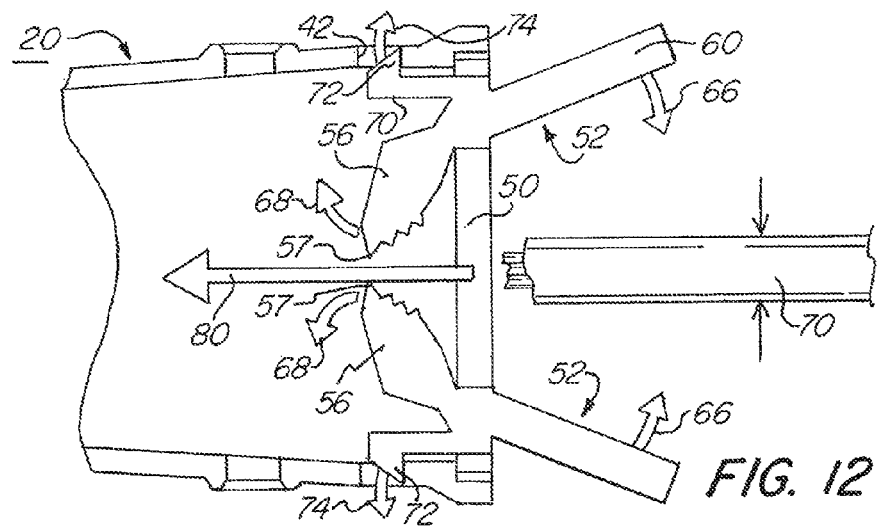
FIGS. 12, 13 and 14 are enlarged cross-sectional views of the electrical fitting taken along the region about the cable securing device, illustrating how a non-metallic electrical cable is inserted into the cable securing device and how the removal of the electrical cable is facilitated as specifically shown in FIG. 14.
Figure 14:
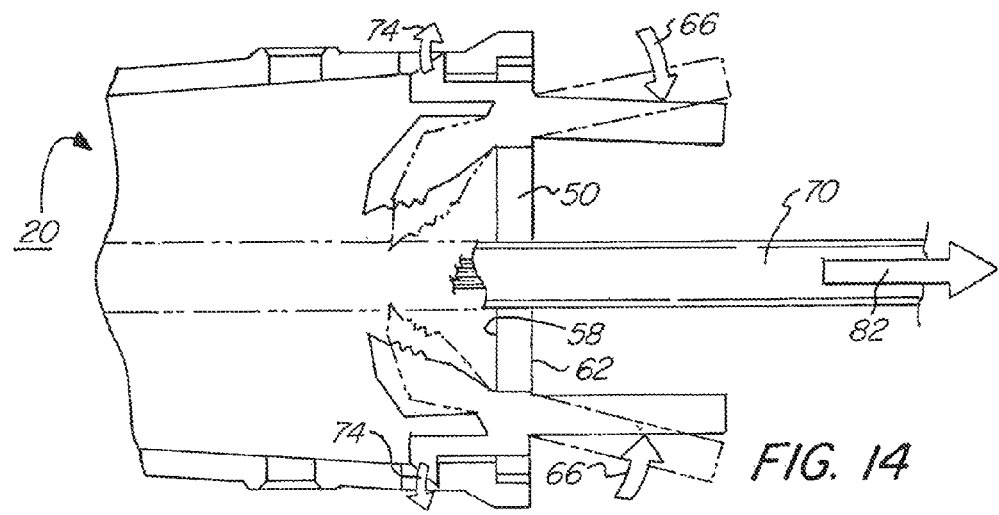

Each clamping device 52 has a pair of clamp fingers 56 each with a terminating end 57. The clamp fingers of each pair are able to resiliently move relative to each other. The terminating ends of each pair of clamp fingers are adjacent each other and allow one or more NM cables 70 to pass therebetween as seen in FIGS. 12-16, with the clamp fingers resiliently pressing against the cable(s) passing therebetween. The clamp fingers may include one or more ridges 59 to help grasp an NM cable 70 as seen in FIGS. 12-16. The clamp fingers extend from a first surface 58 of plate 50. A pair of arms 60 are integrally (monolithically) formed with the clamp fingers 56 at a second end 64 of the clamp fingers and extend from a second surface 62 of plate 50 as seen in FIGS. 7 and 12-16. When the arms are squeezed together in the direction of arrows 66, the clamp fingers 56 move away from each other so that their terminating ends 57 move away from each other as seen by arrow 68 shown in FIG. 7. In this manner, the insertion/removal of a non-metallic electrical cable 70 into/out of fitting 20 can be facilitated, as seen in FIGS. 12-14.

Each clamping device 52 also includes a pair of anchoring fingers 69 which also extending from first surface 58 of plate 50. Each anchoring finger 69 has a projecting member 72 dimensioned to snap fit into an aperture 42 in body 22. Thus, the cable securing device is assembled into the body via the snap-in action of the projecting members snapping into apertures 42 as best seen in FIGS. 2, 3, 9 and 12-16.

FIGS. 12-16 show that due to the resilient movement of the clamp fingers 56, NM electrical cables of different sizes and multiple electrical cables, as shown in FIG. 16, can be readily accommodated.

Figure 7:
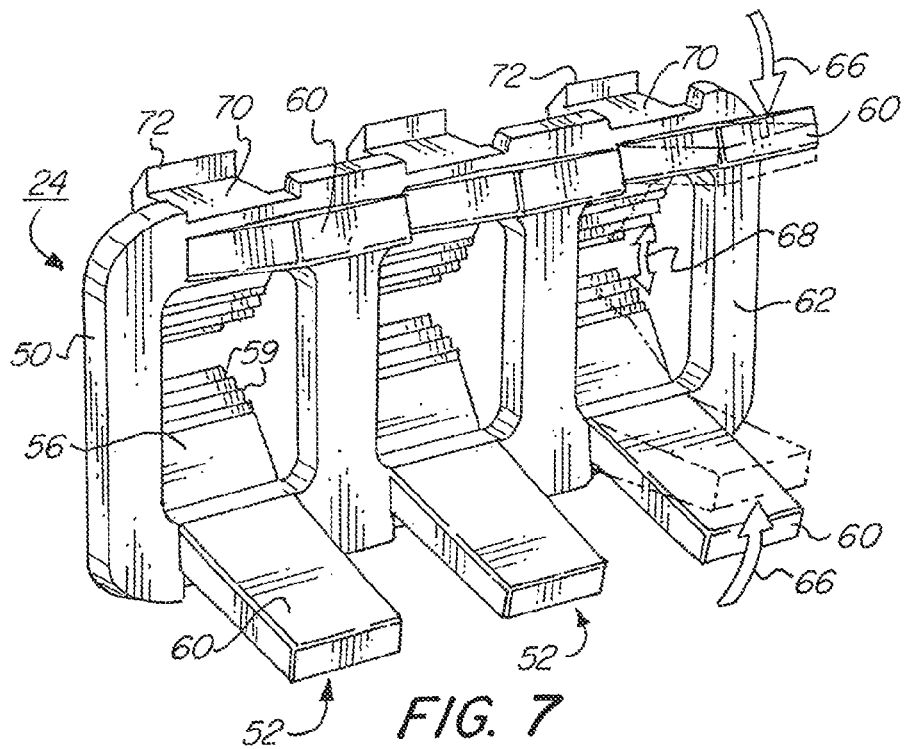
FIG. 7 is a rear perspective view of a cable securing device shown in FIG. 1, but from a rear perspective view.
Figure 8:
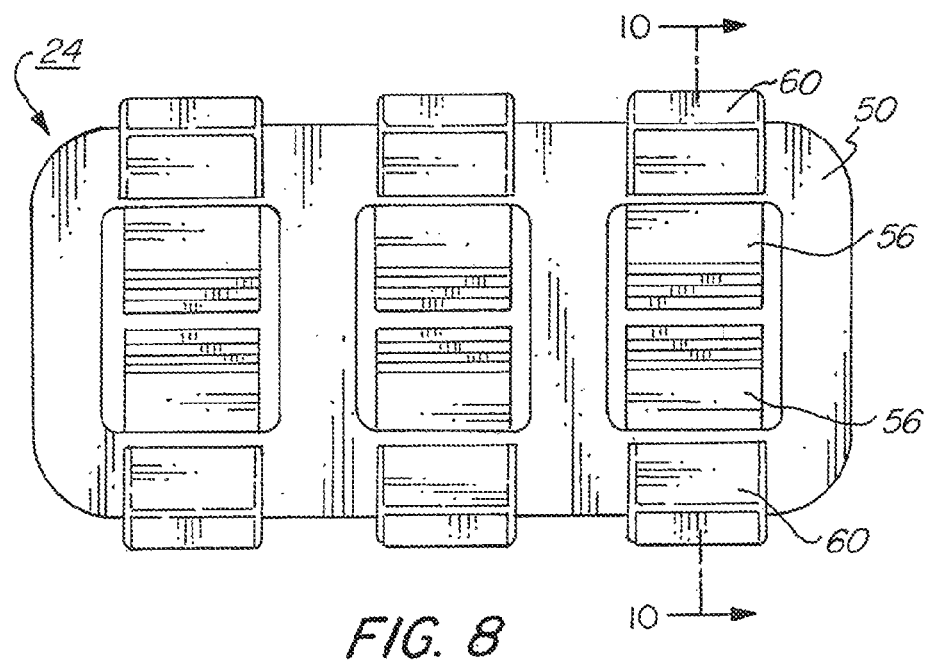
FIG. 8 is a rear view of the cable securing device shown in FIG. 7.

The overall operation of this fitting is best seen in FIGS. 7 and 12-14. As seen in FIGS. 7 and 12, when arms 60 are squeezed toward each other, as shown by arrows 66, the terminating ends 57 of clamp fingers 56 move away from each other as shown by arrow 68. Simultaneously, projecting members 72 of anchoring fingers 69 are urged against apertures 42 in body 22 as shown by arrows 74. This effectively enhances the anchoring of clamping devices 52 to body 22 and thus the overall cable securing device 24 to body 22 when arms 60 are squeezed together either during insertion of an electrical cable 70 into the fitting 20 (see arrow 80 in FIG. 12), or when an electrical cable 70 is being pulled from the fitting 20 (see arrow 82 in FIG. 14).

Thus, the insertion and removal of the NM electrical cable relative to the fitting is shown in FIGS. 12 and 14 by arrows 80 and 82 respectively. This enhanced securement of the cable securing device 24 relative to body 22 is achieved without the need for fasteners of any sort since the cable securing device is positioned and held in place relative to housing 20 by the protruding members 72 on anchoring fingers 69 of the associated clamping devices 52.

The cable securing device can be made from various materials, including thermoplastics. The clamping devices are preferably fabricated from nylon (such as nylon 6-6, sometimes referred to as nylon 6,6) in order to have the strength and flexibility to grasp NM cables. Nylon 6-12 may also be used to fabricate the cable securing device. This material is less hygroscopic than nylon 6-6 and therefore maybe is less susceptible to molding processing issues (i.e., too much heat or too much moisture, etc.) which can cause brittleness in the molded cable securing device. Other thermoplastics having similar properties to nylon 6-6 or nylon 6-12 may also be used. The entire cable securing device can be fabricated from the same material, such as nylon 6-6.

Figure 23:
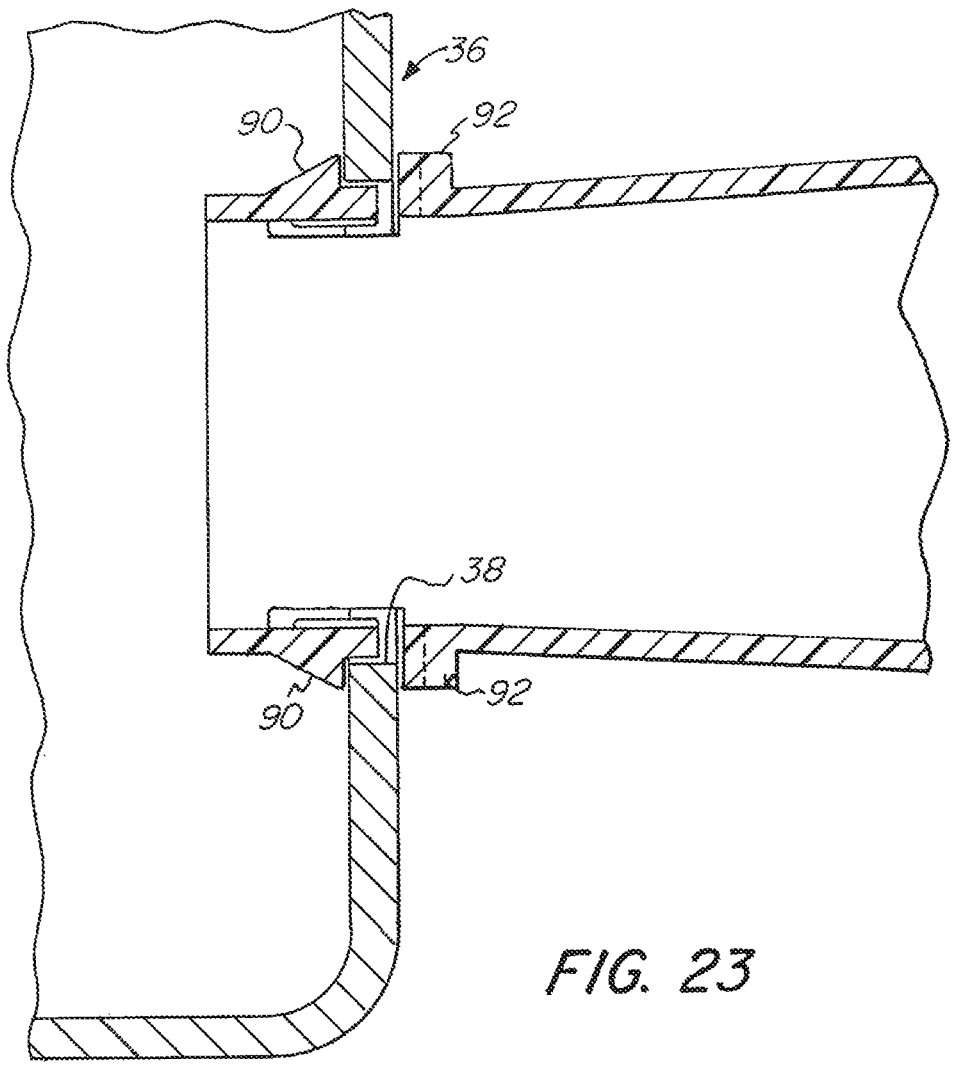
FIG. 23 is an enlarged cross-sectional view of the first end of the embodiment shown in FIG. 19 taken along line 23-23 of FIG. 22.
Figure 24:
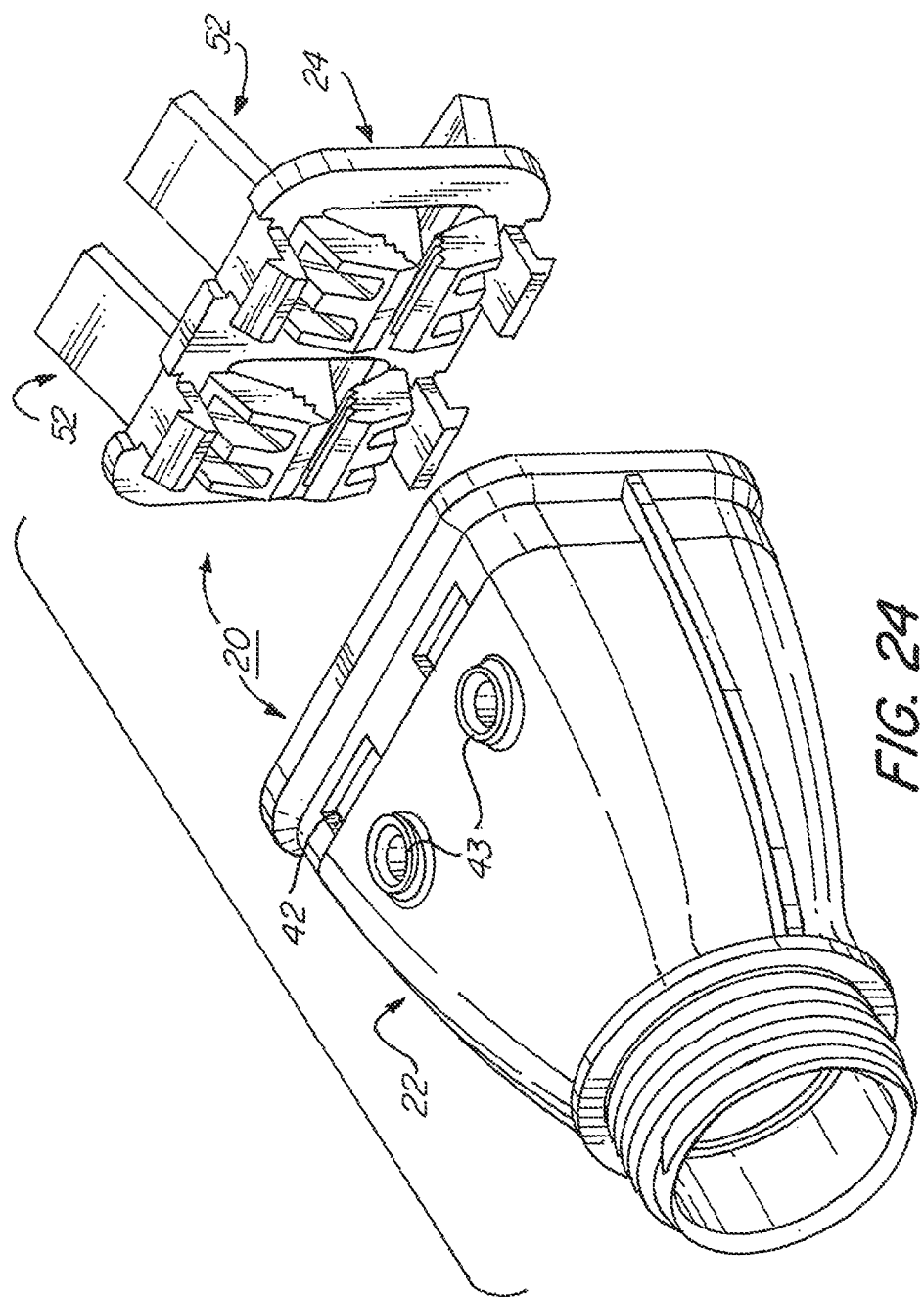
FIG. 24 is an exploded front perspective view of an embodiment of the electrical fitting similar to FIG. 1, but having two clamping devices configured to secure two (or more) NM electrical cables.
Figure 25:
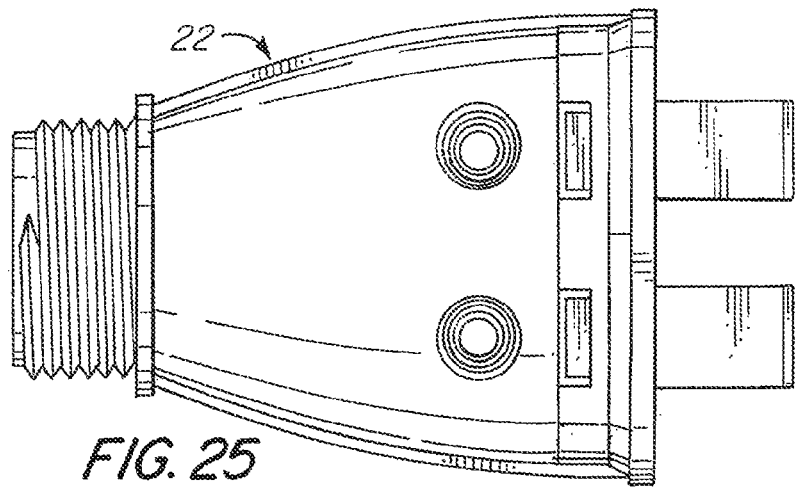
FIG. 25 is a top view of an embodiment of the electrical fitting as shown in FIG. 24, the bottom view being a mirror image thereof.
Figure 26:
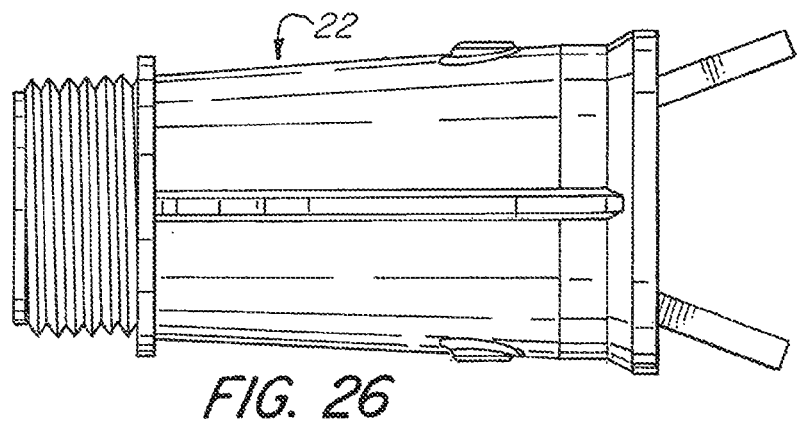
FIG. 26 is a right side view of an embodiment of the electrical fitting shown in FIG. 24, the left side view being a mirror image thereof.
Figure 27:
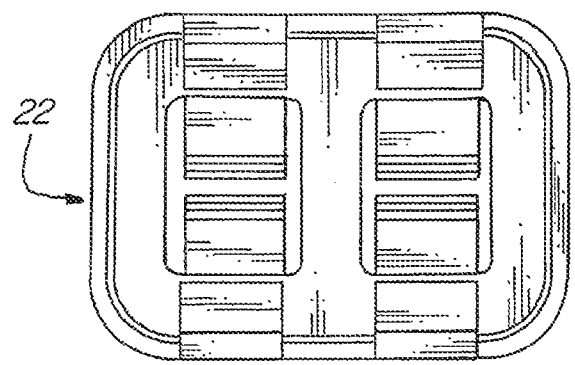
FIG. 27 is a rear view of the electrical fitting as shown in FIG. 24.
Figure 28:
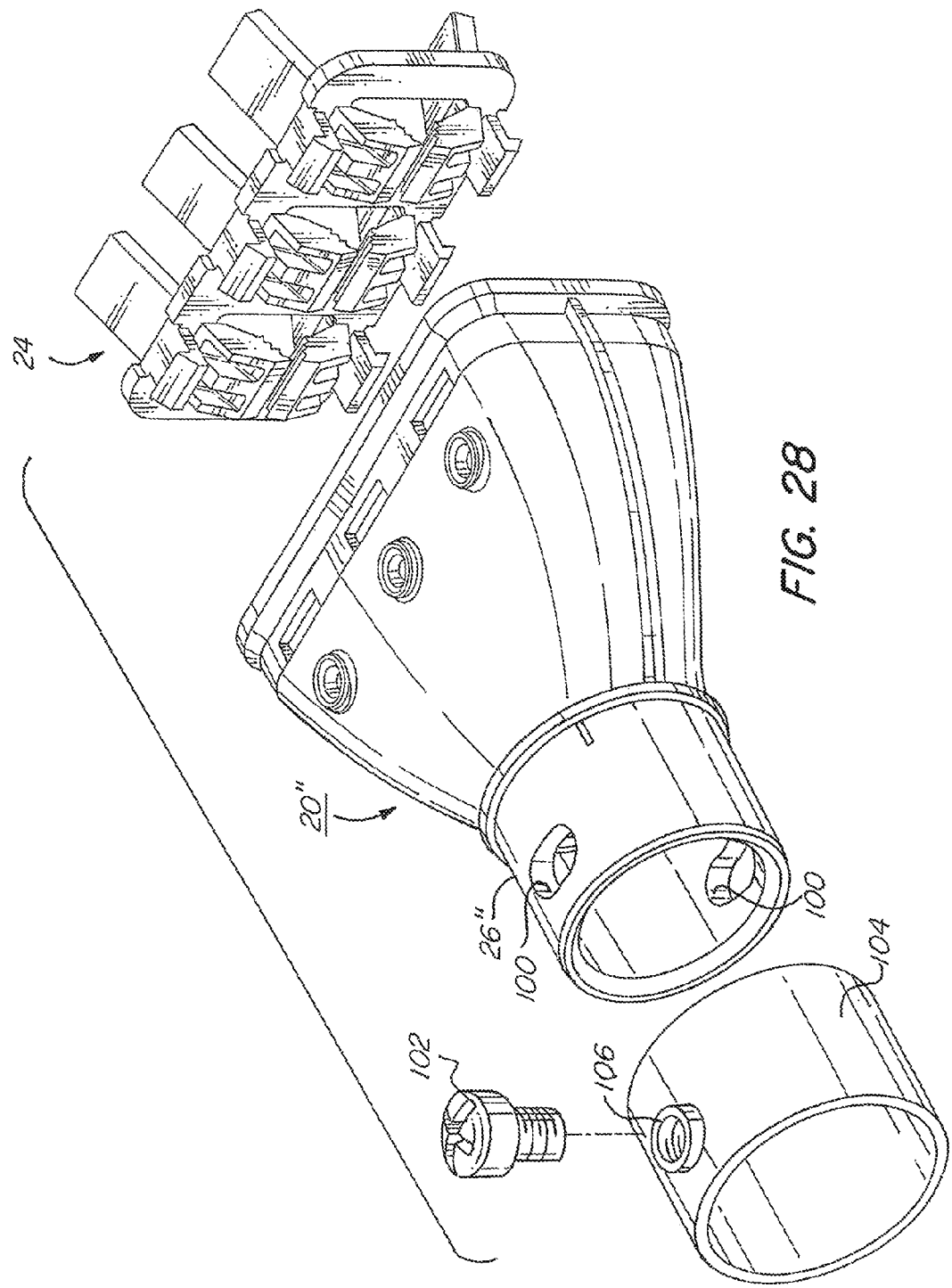
FIG. 28 is an exploded front perspective view of another embodiment of the electrical fitting (transition fitting) particularly suited for connection to an electrical metallic tubing or rigid conduit.
Figure 29:
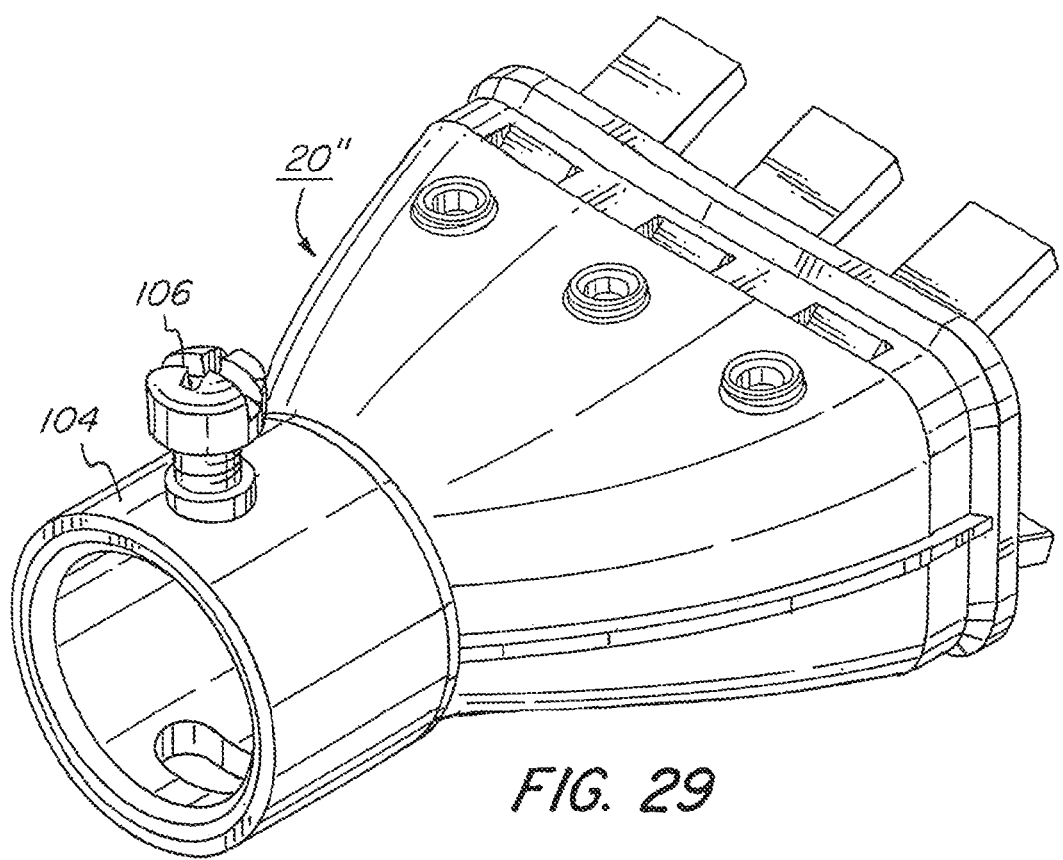
FIG. 29 is a front perspective view of the electrical fitting as shown in FIG. 28.

FIGS. 19-23 illustrate an embodiment of the present invention 20' in which the first end 26' of body 22 can have flexible extending members 90 and an associated flange 92 so as to snap-in connect the fitting to a knockout hole 38 in an electrical panel box 36 as best seen in FIG. 23.

FIGS. 24-27 show an embodiment of the connector fitting for multiple non-metallic electrical cables in which the cable securing device 24 incorporates two clamping devices 52. Other embodiments of the present invention can incorporate four or more clamping devices and an embodiment with a single clamping device is contemplated within the scope of the present invention.

Figure 30:
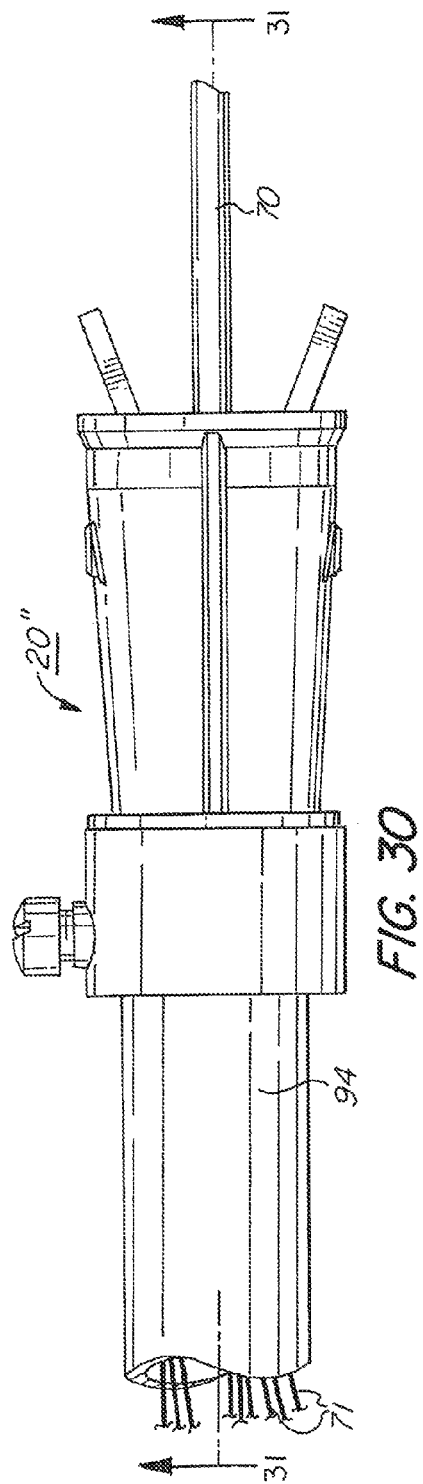
FIG. 30 is a side view of the embodiment of the electrical fitting shown in FIG. 29 connected to an electrical metallic tubing or rigid conduit.
Figure 31:
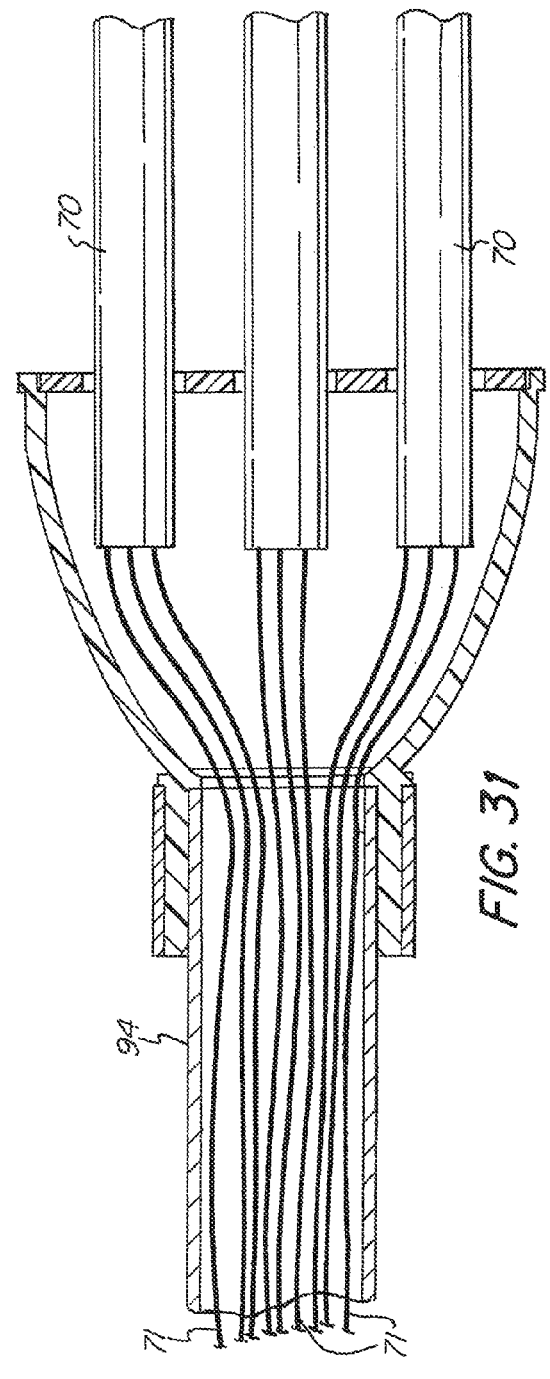
FIG. 31 is a cross-sectional view of the embodiment of the electrical fitting shown in FIG. 30 taken along line 31-31 of FIG. 30.

FIGS. 28-31 show an embodiment of the fitting 20" for transitioning multiple non-metallic electrical cables to an electrical metallic tubing (EMT) or rigid conduit 94 as specifically shown in FIGS. 30 and 31. This embodiment of the electrical fitting (sometimes called an electrical transition fitting) has a first end 26" which includes at least one opening 100 passing therethrough for passage of a retaining screw 102 so as to secure the EMT 94 or rigid conduit 94 to the transition fitting 20". This embodiment incorporates a metallic sleeve 104 with a threaded boss 106. The sleeve can be pressed onto or glued or otherwise secured to first end 26". The sleeve provides additional structural rigidity to the transition fitting so as to securely retain the EMT or rigid conduit.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An electrical fitting to secure multiple non-metallic electrical (NM) cables, comprising:
    a body having a first end having a bore formed therethrough either dimensioned for insertion into a knockout hole of an electrical panel box or the like or dimensioned to receive an electrical metallic tubing or rigid conduit, and a second end having an opening formed therein and with apertures formed near a periphery thereof, the body having a hollow interior for passage of non-metallic electrical cables therethrough; and
    a cable securing device having:
        a plate dimensioned to mount to the body at the second end of the body, and
        a plurality of clamping devices integrally formed with the plate, each clamping device having
            a pair of clamp fingers extending from a first surface of the plate, each finger of the pair of clamp fingers having a terminating end adjacent the terminating end of the other clamp finger of said pair of clamp fingers, each pair of clamp fingers dimensioned to allow passage of at least one NM electrical cable between said terminating ends, the clamp fingers dimensioned for resilient movement relative to each other so as to grasp an NM electrical cable or cables passing between the terminating ends thereof,
            a pair of arms integrally formed at a second end of each clamp finger and extending beyond a second surface of the plate, the arms dimensioned for squeezing, and
            a pair of anchoring fingers integrally formed with the pair of clamp fingers and arms, said anchoring fingers extending from the first surface of the plate, each anchoring finger having a protruding member formed on an end of said anchoring finger, each protruding member dimensioned for receipt in one of the apertures formed in the body;
        wherein each protruding member is urged toward the body when the arms of the clamping device are squeezed together while the terminating ends of the clamp fingers are correspondingly moved away from each other, thereby facilitating insertion of a cable or cables between the terminating ends of the clamp fingers or release of a cable or cables secured by the terminating ends of the clamp fingers, while simultaneously securing the clamping device to the body during squeezing of the arms.

2. The electrical fitting according to claim 1, wherein each clamp finger has at least one ridge formed thereon facing toward the other clamp finger of said pair of clamp fingers, said at least one ridge of each clamp finger to facilitate grasping of an electrical cable.

3. The electrical fitting according to claim 2, wherein the cable securing device is fabricated from nylon.

4. The electrical fitting according to claim 3, wherein the nylon is nylon 6-6.

5. The electrical fitting according to claim 3, wherein the nylon is nylon 6-12.

6. The electrical fitting according to claim 1, wherein the first end of the body has a cylindrical shape with threads on an exterior of the first end, the first end dimensioned for receipt of a locking nut so as to secure the fitting to a panel box or the like after insertion through a knockout of the panel box or the like.

7. The electrical fitting according to claim 1, wherein the first end of the body has a cylindrical shape with extending flexible tabs formed thereon for snap-in engagement to a panel box or the like when inserted into a knockout hole of the panel box or the like.

8. The electrical fitting according to claim 7, wherein the first end has a flange formed thereon in proximity to the tabs so as to facilitate said snap-in engagement.

9. The electrical fitting according to claim 1, wherein the first end of the body is cylindrical in shape dimensioned for receipt of a metallic sleeve thereover and having at least one opening formed therein, the metallic sleeve providing additional structural rigidity to the first end of the body, the sleeve having a threaded hole formed therein alignable with the at least one opening formed in the first end of the body for passage of a fastener so as to secure an electrical metallic tubing or rigid conduit when placed within the bore formed in first end of the plastic body.

10. The electrical fitting according to claim 1, wherein the body is formed from plastic.

11. The electrical fitting according to claim 10, wherein the plastic is polyvinylchloride.

12. The electrical fitting according to claim 1, wherein the body is fabricated from die cast zinc or die cast aluminum.

13. The electrical fitting according to claim 1, wherein the plurality of clamping devices equals three.

14. The electrical fitting according to claim 1, wherein the plurality of clamping devices equals two.

15. A cable securing device comprising:
    a plate dimensioned to mount to a body of an electrical fitting, and
    a plurality of clamping devices integrally formed with the plate, each clamping device having
        a pair of clamp fingers extending from a first surface of the plate, each finger of the pair of clamp fingers having a terminating end adjacent the terminating end of the other clamp finger of said pair of clamp fingers, each pair of clamp fingers dimensioned to allow passage of at least one non-metallic (NM) electrical cable between said terminating ends, the clamp fingers dimensioned for resilient movement relative to each other so as to grasp an NM electrical cable or cables passing between the terminating ends thereof, a pair of arms integrally formed at a second end of each clamp finger and extending beyond a second surface of the plate, the arms dimensioned for squeezing, and a pair of anchoring fingers integrally formed with the pair of clamp fingers and arms, said anchoring fingers extending from the first surface of the plate, each anchoring finger having a protruding member formed on an end of said anchoring finger, each protruding member dimensioned for receipt in an aperture formed in a body of an electrical fitting;

wherein each protruding member is urged toward the body when the plate is mounted to the body and when the arms of the clamping device are squeezed together while the terminating ends of the clamp fingers are correspondingly moved away from each other, thereby facilitating insertion of a cable or cables between the terminating ends of the clamp fingers or release of a cable or cables secured by the terminating ends of the clamp fingers, while simultaneously securing the clamping device to the body during squeezing of the arms.

16. The electrical fitting according to claim 15, wherein each clamp finger has at least one ridge formed thereon facing toward the other clamp finger of said pair of clamp fingers, said at least one ridge of each clamp finger to facilitate grasping of an electrical cable.

17. The electrical fitting according to claim 16, wherein the cable securing device is fabricated from nylon.

18. The electrical fitting according to claim 17, wherein the nylon is nylon 6-6.

19. The electrical fitting according to claim 17, wherein the nylon is nylon 6-12.

20. The electrical fitting according to claim 15, wherein the plurality of clamping devices equals three.

21. The electrical fitting according to claim 15, wherein the plurality of clamping devices equals two.

* * * * *